(12) United States Patent
Berning et al.

(10) Patent No.: US 9,915,043 B2
(45) Date of Patent: Mar. 13, 2018

(54) AUTOMOTIVE MILLING MACHINE, AS WELL AS METHOD FOR UNLOADING MILLED MATERIAL

(71) Applicant: Wirtgen GmbH, Windhagen (DE)

(72) Inventors: Christian Berning, Bruhl (DE); Dirk Franzmann, Hennef (DE); Armin Montermann, Andernach (DE); Cyrus Barimani, Konigswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/000,161

(22) Filed: Jan. 19, 2016

(65) Prior Publication Data

US 2016/0208447 A1 Jul. 21, 2016

Related U.S. Application Data

(63) Continuation of application No. 14/422,238, filed as application No. PCT/EP2013/067418 on Aug. 21, 2013, now abandoned.

(30) Foreign Application Priority Data

Aug. 23, 2012 (DE) .................. 10 2012 215 013

(51) Int. Cl.
  *E01C 23/088* (2006.01)
  *E01C 23/12* (2006.01)
  *G05D 1/02* (2006.01)

(52) U.S. Cl.
  CPC .......... *E01C 23/088* (2013.01); *E01C 23/127* (2013.01); *G05D 1/0293* (2013.01);
  (Continued)

(58) Field of Classification Search
  CPC ...... E01C 23/127; E01C 23/065; E01C 23/08; E01C 23/088
  (Continued)

(56) References Cited

U.S. PATENT DOCUMENTS 3,608,968 A 9/1971 Burnett
4,376,609 A 3/1983 Bohman et al.
(Continued)

FOREIGN PATENT DOCUMENTS

DE 155157 5/1982
DE 19628420 A1 1/1998
(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.
(Continued)

*Primary Examiner* — David J Bagnell
*Assistant Examiner* — Michael A Goodwin
(74) *Attorney, Agent, or Firm* — Lucian Wayne Beavers; Gary L. Montle; Patterson Intellectual Property Law, P.C.

(57) ABSTRACT

In an automotive milling machine, with a height-adjustable machine frame, with a controller for the travelling and milling operation, with a working drum, with a slewable transport conveyor device arranged in front of or behind the working drum as seen in the direction of travel of the milling machine, where the last or single transport conveyor of the transport conveyor device as seen in the direction of transport is slewable sideways, relative to the machine frame, about an essentially vertical axis under a slewing angle, and about an axis orthogonal to the axis under an elevation angle, and where the transport conveyor discharges the milled material at a specified conveying speed onto a point of impingement on a loading surface of a transport vehicle, it is provided for the following features to be achieved: the controller comprises a detection and control system which
(Continued)

continuously locates the alterable position of the loading surface of the transport vehicle and of the transport conveyor relative to the machine frame, or the alterable position of the loading surface of the transport vehicle relative to the transport conveyor, and continuously controls positioning of the point of impingement of the milled material automatically via the slewing angle and/or the elevation angle and/or the conveying speed of the transport conveyor in such a way that the discharged milled material impinges within the loading surface.

16 Claims, 3 Drawing Sheets

(52) U.S. Cl.
CPC ......... *G05D 1/0246* (2013.01); *G05D 1/0261* (2013.01); *G05D 2201/0202* (2013.01)

(58) Field of Classification Search
USPC .... 299/1.5, 1.9, 39.2, 39.4; 404/84.05, 84.1, 404/91, 94; 198/315, 316.1, 318–320; 701/50
See application file for complete search history.

(56) References Cited

U.S. PATENT DOCUMENTS

| | | | |
|---|---|---|---|
| 4,863,009 | A | 9/1989 | Winkel et al. |
| 5,575,316 | A | 11/1996 | Pollklas |
| 5,749,783 | A | 5/1998 | Pollklas |
| 5,857,274 | A | 1/1999 | Rüdiger et al. |
| 6,247,510 | B1 | 6/2001 | Diekhans et al. |
| 6,366,684 | B1 | 4/2002 | Gerard et al. |
| 6,682,416 | B2 | 1/2004 | Behnke et al. |
| 6,943,824 | B2 | 9/2005 | Alexia et al. |
| 7,831,345 | B2 | 11/2010 | Heino et al. |
| 8,499,537 | B2 | 8/2013 | Correns et al. |
| 8,528,988 | B2 | 9/2013 | Von Schönebeck et al. |
| 8,590,983 | B2 | 11/2013 | Beming et al. |
| 9,126,776 | B2 | 9/2015 | von Schönebeck et al. |
| 2003/0174207 | A1 | 9/2003 | Alexia et al. |
| 2005/0179309 | A1 | 8/2005 | Beming et al. |
| 2005/0207841 | A1 | 9/2005 | Holl et al. |
| 2006/0045621 | A1 | 3/2006 | Potts et al. |
| 2008/0153402 | A1* | 6/2008 | Arcona .................. B24B 7/188 451/352 |
| 2008/0245042 | A1 | 10/2008 | Brunnert et al. |
| 2008/0258535 | A1 | 10/2008 | Beming et al. |
| 2009/0044505 | A1 | 2/2009 | Huster et al. |
| 2009/0229233 | A1 | 9/2009 | Pollklas et al. |
| 2009/0267402 | A1 | 10/2009 | Beming et al. |
| 2010/0014917 | A1 | 1/2010 | Willis et al. |
| 2010/0063692 | A1 | 3/2010 | Madsen et al. |
| 2010/0070144 | A1 | 3/2010 | Burke et al. |
| 2010/0296867 | A1 | 11/2010 | Buschmann et al. |
| 2011/0061762 | A1 | 3/2011 | Madsen et al. |
| 2011/0080034 | A1 | 4/2011 | Schönebeck et al. |
| 2011/0123268 | A1 | 5/2011 | Beming et al. |
| 2011/0213531 | A1* | 9/2011 | Farley ............... A01D 41/1275 701/50 |
| 2011/0307149 | A1 | 12/2011 | Pighi et al. |
| 2013/0076101 | A1 | 3/2013 | Simon |
| 2013/0080000 | A1 | 3/2013 | Von der Lippe et al. |

FOREIGN PATENT DOCUMENTS

| | | |
|---|---|---|
| DE | 102005035480 A1 | 2/2007 |
| DE | 202007005756 U1 | 8/2008 |
| DE | 102009041842 A1 | 9/2011 |
| EP | 0666018 A1 | 8/1995 |
| EP | 1344445 A1 | 9/2003 |
| EP | 1574122 B1 | 9/2005 |
| EP | 2100495 A1 | 9/2009 |
| EP | 2301318 B1 | 11/2011 |
| EP | 2452551 A2 | 5/2012 |
| EP | 2573266 A2 | 3/2013 |
| EP | 2573267 A1 | 3/2013 |
| JP | 61257118 A | 11/1986 |
| JP | 09086672 A | 3/1997 |
| JP | 11050415 A | 2/1999 |
| JP | 2008163734 A | 7/2008 |
| JP | 2009263136 A | 11/2009 |
| WO | 2009098294 A2 | 8/2009 |

OTHER PUBLICATIONS

Database Compendex XP-002538699, Engineering Information, Inc., Gove et al "Optimizing Truck-Loader Matching", Mining Engineering, Oct. 1994, pp. 1179-1185, Soc. for Mining, Metallurgy & Exploration, Inc.

Office Action in U.S. Appl. No. 13/624,586 to Jom Von der Lippe, dated Mar. 31, 2015, 28 pp.

* cited by examiner

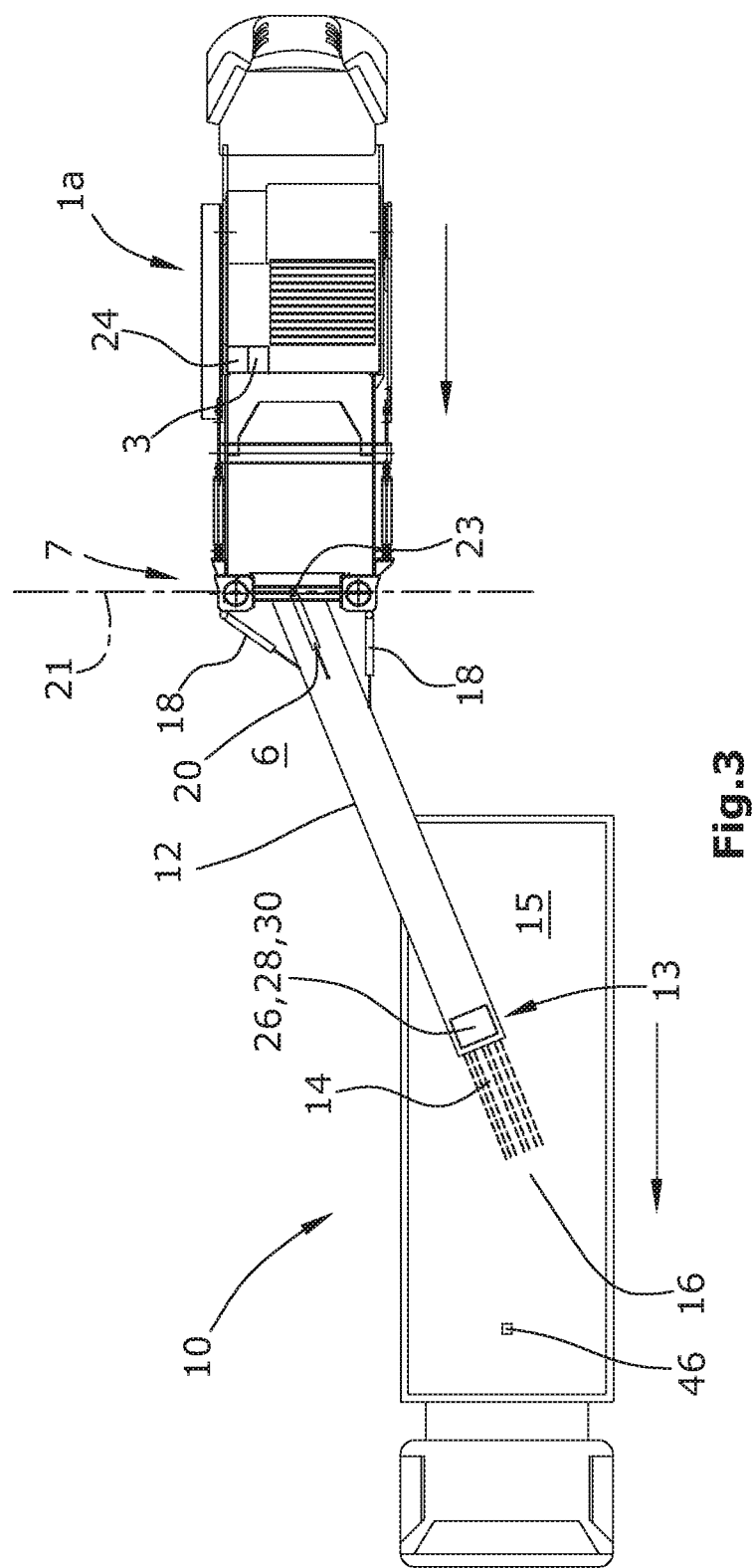

AUTOMOTIVE MILLING MACHINE, AS WELL AS METHOD FOR UNLOADING MILLED MATERIAL

BACKGROUND OF THE INVENTION

1. Field of the Invention

The invention relates to an automotive milling machine as well as to a method for unloading milled material.

2. Description of the Prior Art

With an automotive milling machine, it is known to discharge the milled material onto no less than one transport vehicle with a loading surface.

The milling machine comprises a controller for the travelling and milling operation as well as a working drum for the milling of, for example, a road pavement. A transport conveyor device, for example, a transport conveyor device comprising no less than one transport conveyor is located in front of or behind the working drum as seen in the direction of travel. The transport conveyor device comprises a discharge end at which the milled material is discharged onto the loading surface of the no less than one transport vehicle via a flight path in the form of a parabolic trajectory that is attributable to the conveying speed. The last or single transport conveyor of the transport conveyor device as seen in the direction of transport may be slewed sideways, relative to the longitudinal axis of the milling machine, about a specifiable slewing angle to the left or right and may be adjustable in height via a specifiable elevation angle.

In practical operation, problems arise in coordinating the milling machine with the transport vehicle.

With a forward-loading milling machine, for example, the milled material is discharged towards the front onto the transport vehicle driving ahead. The operator of the milling machine needs to signal to the vehicle driver of the transport vehicle as to when the transport vehicle is to continue moving forward. This leads to problems because the operator basically needs to concentrate on the milling process and at the same time needs to avoid a collision with the transport vehicle driving ahead. The information is usually communicated by means of sounding a horn so that, as soon as the vehicle driver of the transport vehicle hears the horn sounding, the transport vehicle is moved forward by a certain distance. A problem arises in the situation where the vehicle driver of the transport vehicle fails to hear the horn alert or if another vehicle driving past emits a horn alert so that the vehicle driver of the transport vehicle erroneously believes to be required to move his vehicle forward. If the vehicle driver fails to hear the horn alert, this may cause a collision of the slewable transport conveyor of the transport conveyor device with the transport vehicle, or the operator of the milling machine needs to stop the continuous milling process.

An additional problem lies in the fact that the operator of the milling machine also needs to deal with loading the loading surface by adjusting the slewing angle, elevation angle and conveying speed of the last or single transport conveyor of the transport conveyor device as seen in the direction of transport and is thus distracted from his actual task of carrying out the milling operation. A correction of the slewing angle may be required, for example, when altering the steering direction of the milling machine.

In case of a rearward-loading milling machine, problems also arise in coordinating the milling machine with the transport vehicle especially as the transport vehicle needs to drive behind the milling machine in reverse travel. An even higher level of stress results for the operator of the milling machine as he needs to control the milling operation in forward travel on the one hand, and needs to monitor loading of the transport vehicle behind the milling machine as seen in the direction of travel, needs to control the slewing angle, elevation angle and/or conveying speed of the transport conveyor device, and needs to communicate the necessary information to the vehicle driver on the other.

SUMMARY OF THE INVENTION

It is therefore the object of the present invention to create an automotive milling machine as well as a method for unloading milled material of a milling machine which enables automatic coordination of the unloading procedure of the milling machine being in the process of milling with the movement of the transport vehicle.

The invention advantageously provides that the controller comprises a detection and control system which continuously locates the alterable position of the loading surface of the transport vehicle and of the last or single slewable transport conveyor of the transport conveyor device as seen in the direction of transport relative to the machine frame, or the alterable position of the loading surface of the transport vehicle relative to the slewable transport conveyor, and which continuously controls positioning of the point of impingement of the milled material automatically via the slewing angle and/or the elevation angle and/or the conveying speed of the slewable transport conveyor in such a way that the discharged milled material impinges within the loading surface.

Such controller enables the operator of the milling machine to concentrate on the milling operation and on travelling along a specified milling track. An automatic unloading procedure is thus realized which ensures automatic coordination of the unloading procedure with the movement of the milling machine and of the transport vehicle even when cornering. For example, the slewing angle of the last or single transport conveyor of the transport conveyor device as seen in the direction of transport may also be controllable in accordance with the steering angle of the automotive milling machine.

It is preferably intended for the detection and control system to continuously control positioning of the point of impingement of the milled material automatically in such a way that the discharged milled material impinges in the centre of the loading surface or at another specifiable point of impingement within the loading surface.

The loading surface may be located, and the position of the transport conveyor and the conveying speed of the slewable transport conveyor may be regulated in such a way that the point of impingement on the loading surface is always maintained at the position specified by the controller independent of the movements of the milling machine and the transport vehicle.

The detection and control system may comprise no less than one detector which continuously detects the position of the loading surface and/or of the slewable transport conveyor of the transport conveyor device, and/or may comprise additional detectors which detect the slewing angle, the elevation angle and/or the conveying speed of the transport conveyor.

A preferred embodiment provides for the detection and control system to continuously locate the position of the loading surface and/or of the last or single transport conveyor of the transport conveyor device as seen in the direction of transport by means of a first image-recording system or a non-optical electronic positioning system, in particular a radio-frequency identification system (RFID), which supplies data for determining the position of the loading surface in relation to the machine frame or to the slewable transport conveyor.

The detection and control system may compare the data for determining the position with specified target position data in order to, in the event of any deviations from the specified target position data, perform a continuous position control for the position of a discharge end and/or of the point of impingement of the milled material and/or a speed control for the conveying speed in accordance with a specified point of impingement.

The detection and control system may comprise a second image-recording system which detects and analyses the filling condition on the loading surface by evaluating the image data and which continuously controls the conveying speed and/or the position of a discharge end and/or of the point of impingement of the milled material relative to the loading surface in order to load the loading surface uniformly and/or in accordance with a specified loading programme. A second image-recording system may be omitted if an image-recording system is already used to locate the position of the loading surface, the image data of which can also be used for detection of the filling condition.

The detection and control system may locate the position of the loading surface as well as regulate the position of the last or single transport conveyor of the transport conveyor device as seen in the direction of transport or the position of the point of impingement and the conveying speed in such a way that the point of impingement on the loading surface is always maintained at the position within the loading surface specified by the controller independent of the movements of the milling machine and of the transport vehicle.

The first and/or second image-recording system or a detector for the radio-frequency identification system (RFID) may be arranged at the discharge end of the single or last transport conveyor as seen in the conveying direction of the milled material.

Arranging such positioning system at the discharge end of the transport conveyor enables the position of the transport vehicle relative to the last or single transport conveyor of the milling machine as seen in the direction of transport to be detected without it being necessary to additionally determine the position of the milling machine.

Furthermore, the image data may be analysed to determine how and to what extent the loading surface has been filled. Controlling the conveying speed and/or the position of the discharge end of the transport conveyor or of the point of impingement of the milled material respectively relative to the loading surface enables uniform loading of the loading surface. The filling condition on the loading surface may be detected and analysed by an image-recording system, and the conveying speed and/or the position of the discharge end of the transport conveyor relative to the loading surface may be continuously controlled in order to load the loading surface uniformly and/or in accordance with a specified loading programme.

It may also be of advantage, however, to vary the point of impingement on the loading surface in order to achieve uniform loading of the loading surface.

It is intended for the detection and control system to control the position of the discharge end of the transport conveyor device and thus the point of impingement on the loading surface by adjusting the lateral slewing angle of the slewable transport conveyor of the transport conveyor device relative to the direction of travel and by adjusting the elevation angle of the slewable transport conveyor of the transport conveyor device.

The detection and control system may emit a signal prior to or latest in the event of any deviation not rectifiable by means of control of the position of the loading surface relative to the position of the last or single transport conveyor of the transport conveyor device as seen in the direction of transport and/or relative to the machine frame. The signal may be used to cause a machine stoppage or take measures to prevent collisions between the vehicles.

In accordance with the loading surfaces of different transport vehicles and/or in accordance with different loading conditions of the loading surface for different positions and/or points of impingement within the position of a loading surface detected by the detection and control system, control data for the slewing angle, elevation angle and/or conveying speed may be stored in a map that is available to the detection and control system. An RFID system enables identification of, for example, loading surfaces of different transport vehicles.

No less than one point of the usually essentially rectangular loading surface or essentially cuboid-shaped loading volume respectively, may carry a marking detectable by the detection and control system.

A movement control signal, for example, a visual or an audible signal may be generated in accordance with the positioning signals. Movement control signals for the transport vehicle have been described in principle in DE 10 2009 041 842 A1.

In accordance with the method according to the present invention, it is intended that the alterable position of the loading surface of the transport vehicle and of the last or single transport conveyor of the transport conveyor device as seen in the direction of transport relative to the machine frame, or the alterable position of the loading surface of the transport vehicle relative to the last or single transport conveyor as seen in the direction of transport is continuously located by a detection and control system, and that positioning of the point of impingement of the milled material is continuously controlled automatically by the detection and control system via the slewing angle and/or the elevation angle and/or the conveying speed of the transport conveyor device in such a way that the milled material is discharged within the loading surface.

Positioning of the point of impingement of the milled material may be continuously controlled automatically by the detection and control system in such a way that the milled material is discharged in the centre of the loading surface or at another specifiable point of impingement within the loading surface.

The position of the loading surface and/or of the last or single transport conveyor of the transport conveyor device as seen in the direction of transport may be continuously located by means of an image-recording system or a non-optical electronic positioning system, in particular a radio-frequency identification system (RFID), which supplies data for determining the position of the loading surface in relation to the machine frame or to the last or single transport conveyor as seen in the direction of travel.

In one embodiment, an image for determining the position of the loading surface in relation to the discharge end of the transport conveyor and/or for determining the filling condition of the loading surface may be recorded and analysed by an image-recording system using a specified sampling frequency. The analysed data are compared with target position data, and the position of the discharge end of the transport conveyor and/or the conveying speed and/or the position of the transport vehicle may be controlled in the event of any deviations being determined.

The target position data may be determined by means of a teach-in procedure.

The position of the geometrical centre of the loading surface may be determined by means of image analysis or by means of the non-optical positioning system, and the position of the current point of impingement on the loading surface may be determined by means of image analysis, and a positioning control of the position of the discharge end and/or of the point of impingement of the milled material, as well as a speed control of the conveying speed of the transport conveyor may be performed in accordance with the desired position of the point of impingement so that a continuous regulation of the position of the current point of impingement is performed.

BRIEF DESCRIPTION OF THE DRAWINGS

In the following, embodiments of the invention are explained in more detail with reference to the drawings.

The following is shown:

FIG. 3 a top view of a milling machine in accordance with FIG. 1.

DETAILED DESCRIPTION

Figure 1:
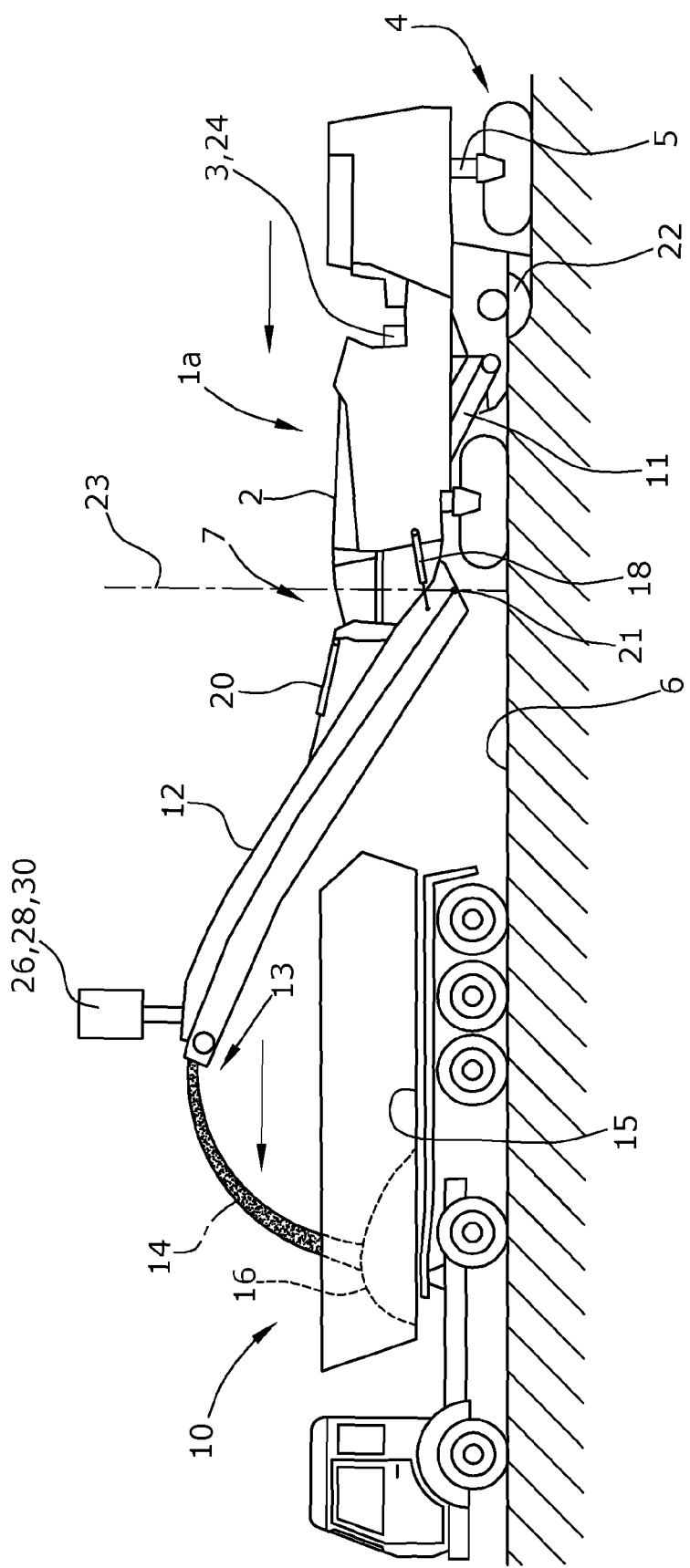
FIG. 1 a forward-loading road milling machine.

FIG. 1 depicts a milling machine using as an example a forward-loading road milling machine 1a. The road construction machine 1 comprises a machine frame 2 which is supported by a chassis 4 comprising, for example, tracked travelling drive units or wheels, said chassis 4 being connected to the machine frame 2 via no less than three height adjustment devices in the form of lifting columns 5. As can be inferred from FIG. 2, four lifting columns 5 are intended for the embodiment which can be used to bring the machine frame 2 into a specifiable plane extending preferably parallel to the road surface 6 which supports the tracked travelling drive units of the chassis 4.

The road milling machine shown in FIG. 1 comprises, in longitudinal direction of the milling machine 1a, a working drum 22 between the tracked travelling drive units of the chassis 4.

The milling machines 1a,1b may comprise tracked travelling drive units and/or wheels. The working drum may be adjustable in height via the lifting columns 5 supporting the machine frame 2 or relative to the machine frame 2.

Other designs of a milling machine 1b may also exhibit the working drum 22, for example, at the height of the rear tracked travelling drive units or wheels of the chassis 4.

The transport conveyor device with no less than one transport conveyor 11,12 for transporting away the milled material may also be arranged at the front end 7 or at the rear end 8 of the milling machine 1a,1b.

Figure 2:
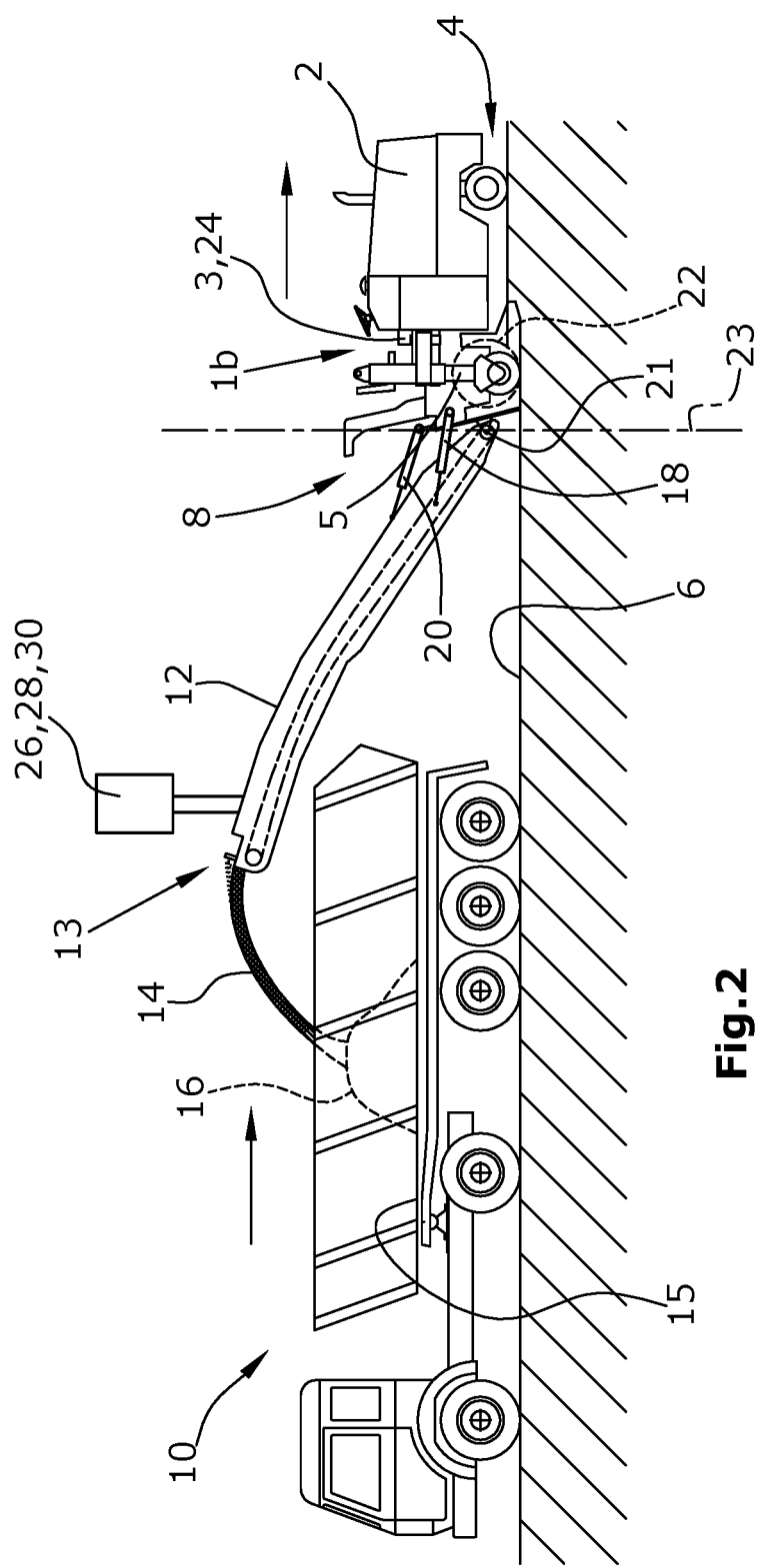
FIG. 2 a rearward-loading road milling machine.

FIG. 2 depicts a rearward-loading milling machine 1b as an example in which the transport vehicle 10 drives behind the milling machine in reverse travel mode.

Provided that sufficient space is available on the side next to the milling machine 1a,1b, the transport vehicle 10 may also be moved next to the milling machine 1 in forward travel as shown in FIG. 3.

The directions of travel of the respective vehicles in FIGS. 1 to 3 are indicated by arrows.

In the embodiment shown in FIG. 1, the milled material milled off by the working drum 22 is discharged onto the loading surface 15 of the transport vehicle 10 via a first permanently installed transport conveyor 11 of the transport conveyor device which transfers the milled material 14 onto a second slewable transport conveyor 12. As a result of the speed of the transport conveyor 12, the milled material 14 is not discharged immediately at the end of the transport conveyor 12, but the milled material follows a parabolic trajectory so that the point of impingement 16 on the loading surface 15 is located at a distance from the free end 13 of the transport conveyor 12. The transport conveyor 12 may be slewed from a neutral position to the left or to the right via piston-cylinder units 18 in order to be able to discharge the milled material 14 onto the loading surface 15 even when cornering or in the event of the transport vehicle 10 driving in an offset track. In addition, the vehicle driver of the milling machine 1a,1b can adjust the elevation angle of the transport conveyor 12 by means of a piston-cylinder unit 20. The elevation angle has an influence on the parabolic trajectory of the milled material 14 and on the position of the point of impingement 16, as has the conveying speed of the transport conveyor 12.

The currently set elevation angle about a horizontal first axis 21 or slewing angle about a vertical second axis 23 respectively is reported to a detection and control system 24 additionally comprising no less than one detector 26 which continuously detects the position of the loading surface 15 and/or of the last or single transport conveyor 12 as seen in the direction of transport. Said detector 26 may be arranged either at the milling machine 1a,1b, at the end facing the transport conveyor device, or at the free end 13 of the transport conveyor 12.

The detection and control system 24 may be integrated into the controller 3 for the travelling and milling operation or may, as a minimum, be connected to the same in order to, should the need arise, also obtain data on the travel speed and/or a detected steering angle of the milling machine 1a,1b and the conveying speed of the transport conveyor 12.

The detection and control system 24 locates the alterable position of the loading surface 15 of the transport vehicle 10 and of the last or single transport conveyor 12 as seen in the direction of transport relative to the machine frame 2, and continuously and automatically controls positioning of the point of impingement 16 of the milled material 14 via the slewing angle and/or the elevation angle and/or the conveying speed of the transport conveyor device so that the discharged milled material 14 impinges, as a minimum, within the loading surface 15. Alternatively, the alterable position of the loading surface 15 of the transport vehicle 10 may also be continuously located relative to the last or single transport conveyor 12 as seen in the direction of transport in order to perform the control operation.

The detection and control system 24 may also undertake the task of filling the loading surface 15 in a uniform fashion. A loading programme may be intended for this purpose in order to load the loading surface 15 in accordance with a predetermined system. In this arrangement, the filling condition on the loading surface 15 may be detected and analysed by an image-recording system in order to continuously control the conveying speed and/or the position of the discharge end 13 of the last or single transport conveyor 12 as seen in the direction of transport relative to the loading surface 15.

Control data for different positions and/or points of impingement 16 may be stored in a map in accordance with the loading surfaces 15 of different transport vehicles 10 and/or in accordance with different loading conditions of the loading surface 15. Such map memory may be integrated in the detection and control system 24 or in the controller 3. The control data concern the slewing angle, the elevation angle and/or the conveying speed of the transport conveyor 5 12 for different positions and/or points of impingement 16 within the position of a loading surface 15 detected by the detection and control system 24.

The detection and control system 24 continuously detects the position of the loading surface 15 and/or of the last or single transport conveyor 12 as seen in the direction of transport by means of an image-recording system 28 or a non-optical electronic positioning system which supplies data for determining the position of the loading surface 15 in relation to the machine frame 2 or to the last or single transport conveyor 12 as seen in the direction of transport. The information provided by the image-recording system 28 may be evaluated by image-analysing methods known for themselves. One example of a non-optical electronic positioning system is a radio-frequency identification system (RFID) which additionally offers the possibility of identifying a particular loading surface 15 of a particular transport vehicle 10.

When localizing the loading surface 15 by means of RFID, permanently installed RFID tags 46 are used at the transport vehicle 10 in particular at the loading surface 15. FIG. 3 schematically illustrates such a tag 46, which is one example of a marking 46 detectable by the detection and control system.

When localizing with Bluetooth sensor nodes as an additional non-optical localization method, sensor nodes distributed in space are used as markings and the signal field strength, which is dependent on the distance, is measured.

It goes without saying that it is also possible to use a combination of different localization methods.

As a general rule, it is possible to use optical and quasi-optical (radio) measurement methods for length and angle, as well as different time measurement processes for time differences and propagation time differences.

The detection and control system 24 may compare the data for determining the position with specified position data in order to, in the event of any deviations from the specified target position data, perform a continuous position control for the position of the discharge end 13 and/or for the point of impingement 16 of the milled material 14 and/or a speed control for the conveying speed.

The target position data may be determined by means of a teach-in procedure in that the positions of the vehicles 1a,1b,10 are varied in accordance with realistic situations and the parameters required for each such situation, namely the slewing angle, elevation angle and conveying speed of the transport conveyor, are stored. In the same way, a loading programme may also be created. In doing so, variations in control arising, for example, during cornering may also be taken into account. In the process, the data read in by means of the reading operation may also differentiate as to whether the transport vehicle 10 is driving on the left or on the right next to the milling track or in the milling track of the milling machine 1a,1b.

The invention claimed is:

1. An automotive milling machine, comprising:
a machine frame;
a working drum connected to the machine frame and configured to mill material from a ground surface;
a transport conveyor arranged in front of or behind the working drum, the transport conveyor being pivotable relative to the machine frame about an essentially horizontal first axis to define an elevation angle, and the transport conveyor being slewable sideways relative to the machine frame about a second axis orthogonal to the first axis to define a slewing angle, the transport conveyor having a conveying speed, wherein the transport conveyor discharges milled material onto a point of impingement on a loading surface of a transport vehicle;
at least one detector configured to supply data corresponding to an alterable position of the loading surface of the transport vehicle relative to the transport conveyor; and
a controller connected to receive the data from the at least one detector and configured to:
compare the received data with specified target position data; and
in the event of any deviations from the specified target position data, continuously control positioning of the point of impingement of the milled material automatically via at least the conveying speed of the transport conveyor such that the discharged milled material impinges on a specified point of impingement on the loading surface, independent of movements of the milling machine and the transport vehicle.

2. The automotive milling machine of claim 1, wherein the detector comprises at least one of:
a loading surface detector configured to continuously detect the position of the loading surface;
a conveyor detector configured to continuously detect the position of the transport conveyor;
a slewing angle detector;
an elevation angle detector; and
a conveying speed detector.

3. The automotive milling machine of claim 1, wherein:
the detector includes an image-recording system or a radio-frequency identification system configured to continuously locate the position of at least one of the loading surface and the transport conveyor and to supply data for determining the position of the loading surface in relation to the transport conveyor.

4. The automotive milling machine of claim 3, wherein:
the controller is configured to
in the event of any deviations from the specified target position data, to perform a continuous position control for at least one of:
a discharge end of the transport conveyor;
the point of impingement; and
the conveying speed.

5. The automotive milling machine of claim 4, wherein:
the controller is configured to emit a signal prior to or at latest in the event of any deviation not rectifiable by control of the position of the loading surface relative to the position of the transport conveyor, as seen in the direction of transport and relative to the machine frame.

6. The automotive milling machine of claim 3, wherein:
the image-recording system or a detector for the radio-frequency identification system is arranged at a discharge end of the transport conveyor.

7. The automotive milling machine of claim 1, wherein:
the detector comprises an image-recording system, and the controller is configured to
detect and analyze a filling condition of the loading surface; and
uniformly load the loading surface by continuously controlling at least one of:
the conveyor speed;

a position of a discharge end of the transport conveyor; and
the point of impingement.

8. The automotive milling machine of claim 1, wherein:
the controller is configured such that control data for at least one of the slewing angle, the elevation angle and the conveying speed are stored in a map in accordance with at least one of:
loading surfaces of different transport vehicles;
different loading conditions of the loading surface for different positions; and
points of impingement on the loading surface.

9. The automotive milling machine of claim 1, wherein:
the detector is configured to detect a marking on the transport vehicle marking at least one point of an essentially rectangular loading surface or an essentially cuboid-shaped loading volume of the transport vehicle.

10. A method of discharging removed milled material from an automotive milling machine onto a point of impingement on a loading surface of a transport vehicle, the method comprising:
(a) removing the milled material from a ground surface with a working drum of the milling machine;
(b) discharging the milled material at a conveying speed from a transport conveyor arranged in front of or behind the working drum relative to a direction of travel of the milling machine, the transport conveyor being slewable sideways in a slewing angle and adjustable in discharge height in an elevation angle;
(c) detecting with a detection and control system an alterable position of the loading surface of the transport vehicle relative to the transport conveyor; and
(d) automatically controlling with the detection and control system the point of impingement of the milled material by controlling at least the conveying speed such that the milled material is discharged onto a specified point of impingement within the loading surface, independent of movements of the milling machine and the transport vehicle.

11. The method of claim 10, wherein:
the detecting of step (c) is performed by an image-recording system or a radio-frequency identification system, to supply data for determining the position of the loading surface in relation to the transport conveyor.

12. The method of claim 11, wherein step (d) further comprises:
comparing the data for determining the position with stored target position data to identify any deviation; and
in the event a deviation is determined, controlling at least one of the position of a discharge end of the transport conveyor, the conveying speed, and the position of the transport vehicle to correct the deviation.

13. The method of claim 12, wherein the target position data are determined by a teach-in procedure.

14. The method of claim 10, further comprising:
detecting a filling condition of the loading surface via an image-recording system; and
wherein step (d) further comprises loading the loading surface uniformly.

15. The method of claim 10, wherein:
step (d) further comprises maintaining the point of impingement at a position specified by the detection and control system independent of movements of the milling machine and the transport vehicle.

16. The method of claim 10, further comprising:
determining a position of a geometrical center of the loading surface via image analysis or via a non-optical positioning system;
determining a position of a current point of impingement on the loading surface by image analysis; and
wherein in step (d) the position of the point of impingement is regulated in accordance with a desired position of the point of impingement.

* * * * *